E. MOSS.
RAISING, LOWERING, AND DEPTH REGULATION OF PLOWS AND OTHER AGRICULTURAL IMPLEMENTS AND VEHICLES.
APPLICATION FILED JUNE 18, 1918.
1,309,299.
Patented July 8, 1919.
2 SHEETS—SHEET 1.
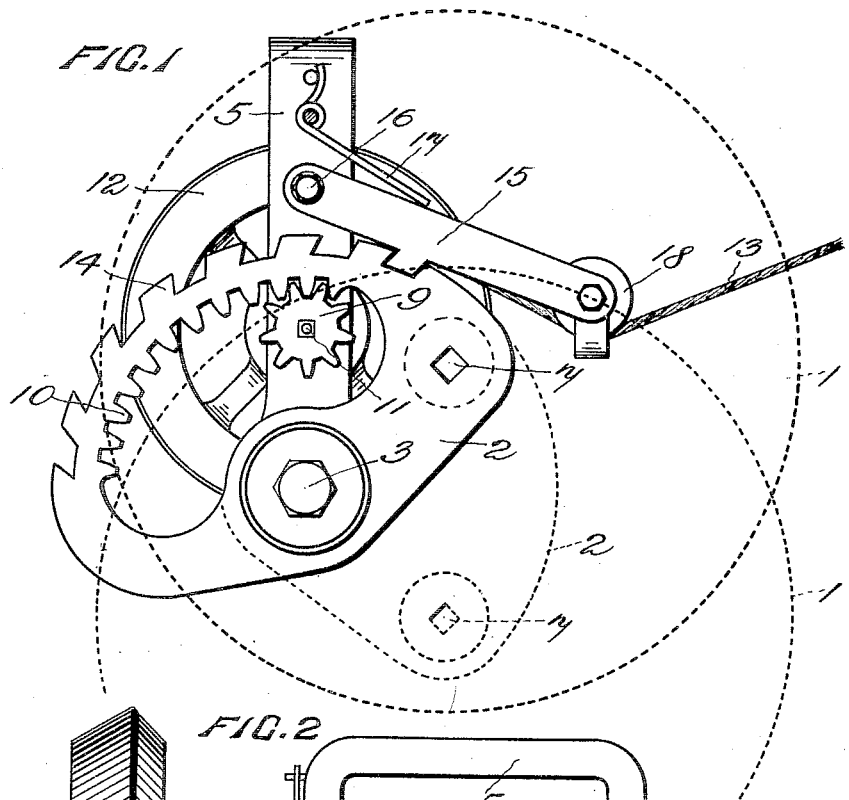
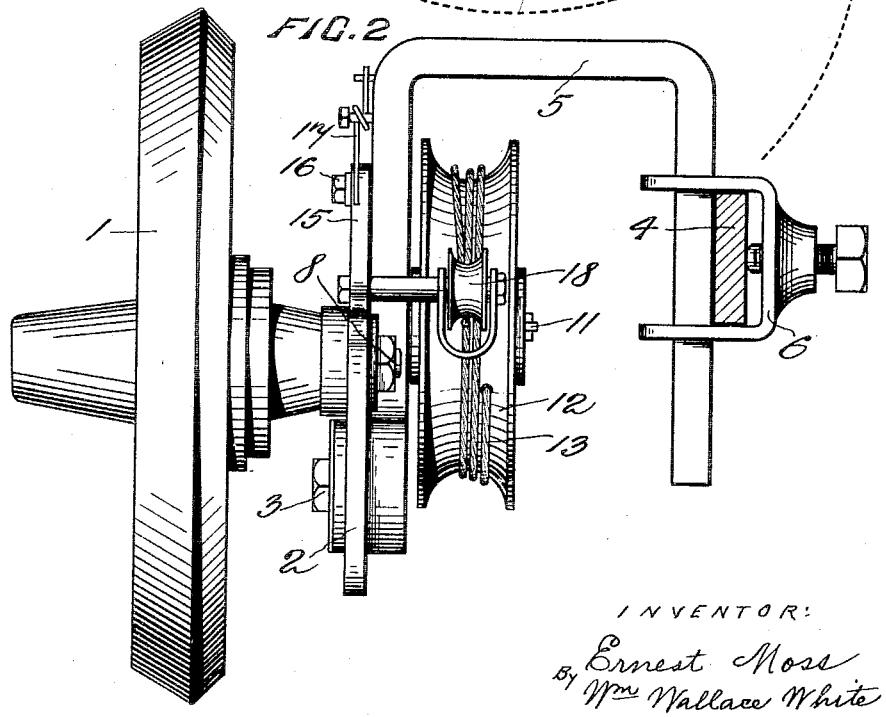
INVENTOR:
Ernest Moss
By Wm Wallace White
ATTY.

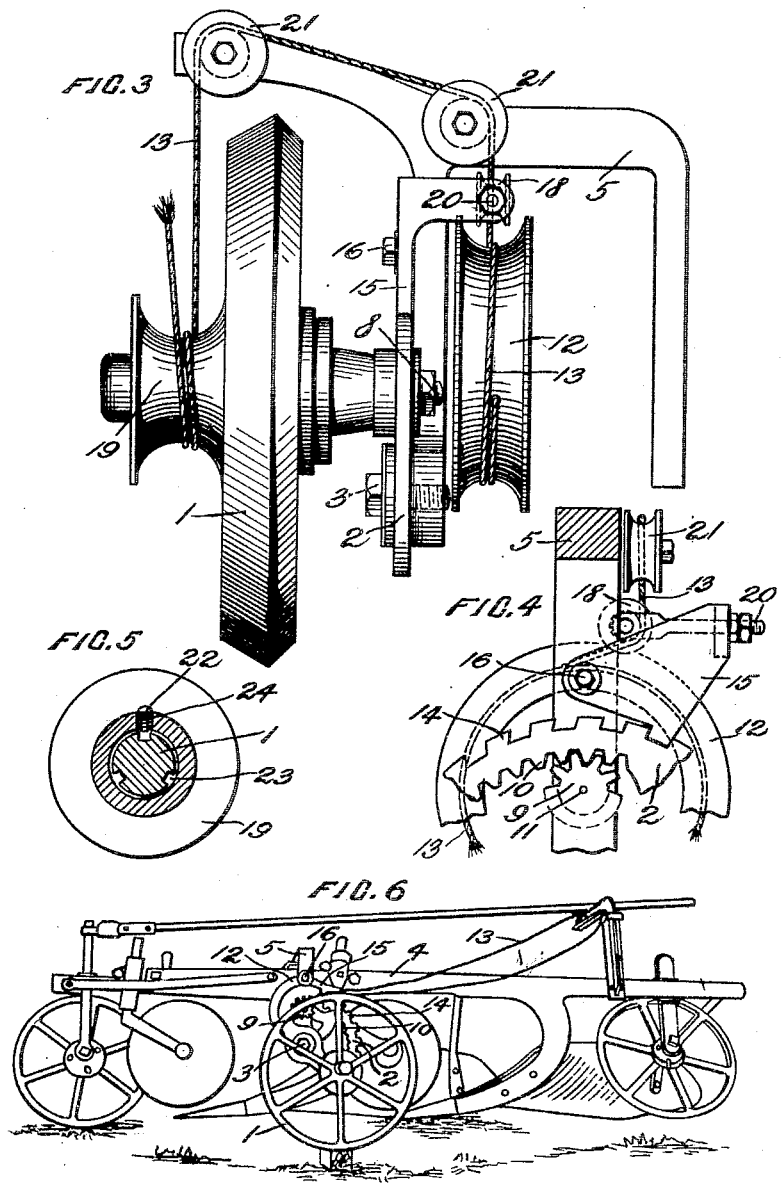

UNITED STATES PATENT OFFICE.

ERNEST MOSS, OF DALLINGTON, CHRISTCHURCH, NEW ZEALAND.

RAISING, LOWERING, AND DEPTH REGULATION OF PLOWS AND OTHER AGRICULTURAL IMPLEMENTS AND VEHICLES.

1,309,299.     Specification of Letters Patent.     Patented July 8, 1919.

Application filed June 13, 1918. Serial No. 240,627.

*To all whom it may concern:*

Be it known that I, ERNEST MOSS, a subject of the King of Great Britain, residing at 486 Retreat road, Dallington, Christchurch, in the Dominion of New Zealand, have invented certain new and useful Improvements in and Relating to the Raising, Lowering, and Depth Regulation of Plows and other Agricultural Implements and Vehicles, of which the following is a specification.

This invention relates to plows and other agricultural implements and vehicles, and refers to means for raising or lowering the frame or body portion of such in relation to one or more of the wheels, as for instance, in the case of a plow when turning at the headlands and for regulating the depth of the work.

It is the object of the present invention to provide a simple and novel construction whereby the operations of raising, lowering, and regulating the depth of the implement may be performed by hand without undue effort, such means being operable from any position so as to suit the various requirements of walking, riding, or tractor-drawn implements.

In order that the nature of the invention and its construction may be fully understood, reference will now be made to the accompanying drawings which illustrate such invention in its application to a plow and in which:—

Figure 1— is a side view of the means devised for mounting and operating the land-wheel, Fig. 2— is a rear view of such mechanism mounted upon the plow beam and with the land-wheel in place, Fig. 3— is a similar view to that of Fig. 2, illustrating a slight modification adapted for use in connection with tractor and other heavy plows, Fig. 4— is a side view of the mechanism employed in connection with the construction shown in Fig. 3, Fig. 5— is a diametrical section through a drum carried upon the outer boss of the land-wheel, as shown in Fig. 3, illustrating, by way of example, a form of clutch adapted to bring such drum into engagement with so as to be rotated by the land-wheel when required, and, Fig. 6— shows the invention applied to a double-furrow walking plow.

In carrying the invention into effect, for the purpose of mounting the land-wheel 1 or other wheel or wheels in relation to which raising or lowering is desired, a gear-wheel, quadrant, or other segment 2 is provided and revolubly mounted, as by means of a stud or the like 3, either directly upon the plow-beam 4 or other portion of the frame, or, as here shown upon a suitably shaped member 5 adapted to be secured to such plow-beam 4 by means of a buckle 6 (Fig. 2) or other suitable device adapted to provide a suitable range of height adjustment.

Eccentrically mounted upon the quadrant 2, as at 7, is a stub-axle 8 upon which is revolubly mounted the land-wheel, thus, with reference to Fig. 1, it will be understood that by turning the quadrant 2 from the full line position to the dotted line position, the plow-frame will be raised in relation to the land-wheel 1, the two extreme positions of which are indicated by the dotted circles.

For the purpose of performing this turning of the quadrant 2, a pinion 9 is provided and adapted to intermesh with the teeth 10 of the quadrant which teeth may be either external or internal, as here shown. The said pinion 9 is revolubly mounted, as by means of a spindle 11 carried in the member 5. Keyed upon the said spindle 11 or otherwise connected with the pinion 9 so as to revolve therewith, is a drum or pulley 12 upon which are wound a few turns of a cord 13, one end of which is attached to such pulley while the end is led to a suitable point for manipulation by the driver. The arrangement is such that when the said cord is tensioned, it will cause the pulley 12 and with it the pinion 9 to rotate in such direction as to cause the quadrant 2 to turn and raise the implement, that is to say, the movement from the full line to the dotted line position, Fig. 1, the reverse or lowering movement being effected by gravity.

To retain the implement in the said upward, downward, or any intermediate position, detent-gear is provided to lock the quadrant 2 from turning. As here shown, this purpose is effected by forming in the periphery of such quadrant a series of notches 14 adapted to be engaged by a suitable pawl 15 pivoted as at 16 to the member 5 and maintained normally in the engaged position by means of a suitable spring 17.

In cases where the teeth 10 are external, the notches 14 may be formed internally in the quadrant or in any case a separate wheel or segment containing the notches 14 may be employed and connected with the quadrant 2.

For the purpose of causing the pawl 15 to disengage the notches 14, the portion of the cord 13 extending between the pulley 12 and the point of manipulation by the driver, is led around a sheave or the like 18 carried upon such pawl and adapted when the latter is in the engaged condition, to carry such portion of the cord somewhat out of its fair lead, as clearly shown in Fig. 1. By this arrangement, it will be obvious that the cord, on being tensioned, will assume a straight line from the point at which it leaves the pulley 12 to that at which it is manipulated by the driver, thus serving to lift the pawl 15 out of engagement with the notches 14 and so leaving the quadrant 2 free to turn. If this slight tension of the cord is merely maintained therefore, the weight of the implement will cause the frame to be lowered but if on the other hand such tension is increased, it will cause the pulley 12 to revolve the pinion 9 and turn the quadrant, thus raising the frame of the implement.

In the case of tractor-drawn plows and other plows and implements in which the manual pull upon the cord 13 would be considerable, the modification shown in Fig. 3, may be resorted to. In this case a drum 19 is mounted or formed upon the boss of the land-wheel 1 and a few turns of the cord 13 are placed around this drum before leading such cord to the point of manipulation.

In this case the pawl 15, may be slightly modified in shape and its sheave 18 adjustably mounted by means of an eye-bolt 20. The cord 13, as it leaves the pulley 12 is led around the sheave 18 and from thence around suitable sheaves or guides 21 to the drum 19, the arrangement being such that the tensioning of such cord 13 will first cause the portion of the cord between the point at which it leaves the pulley 2 and the nearest of the sheaves 21, to assume a straight line, thus causing the pawl 15 to disengage the notches 14, in a similar manner to that already explained.

In this form of the invention, it will be understood that while no strain is placed by the driver on the end of the cord 13, the coils of the latter will remain loose upon the drum 19 and consequently the latter will turn freely within such coils. Upon a tension being placed upon the end of such cord, however, the said coils will be tightened and so caused to frictionally engage the drum, thus materially assisting the driver in performing the lift.

In order to avoid wear of the cord and drum in consequence of the slipping of the coils when not in operation, the drum instead of being a fixture with the land-wheel, may be revolubly mounted upon the boss of the latter and provided with suitable clutch means adapted to bring it into engagement with such land-wheel when tightening of the coils takes place. By way of illustration, a construction of this nature is shown in Fig. 5. In this case a pin or key 22 or plurality of such, is provided and housed within a radial hole or holes extending from the periphery of the middle portion of the drum to the bore of the latter, the said key being adapted, when pressed inward, to enter any one of a series of recesses 23 formed in the corresponding portion of the boss of the land-wheel. The said key is controlled by means of a spring 24 which tends to maintain such key normally outward, in which condition its inner end will be clear of the notches 23, while its outer end or head will project slightly beyond the periphery of the drum and will therefore be in contact with the coils of the cord 13. In this condition therefore, the drum will be permitted to remain stationary while the land-wheel revolves, but upon the cord 13 being tensioned, the coils will exert a pressure upon the head of the key and thus cause the latter to enter the notches 23 and so lock the drum to the land-wheel.

As above described, the operation of both the pulley 12 and the pawl 15 are controlled by means of a single cord 13. If so desired, however, the said cord, instead of being led around the sheave 18, may be employed solely as a means of operating the pulley 12, in which case a second cord will be employed for enabling the driver to manipulate the pawl 15.

By the use of the invention as above described, it will be understood that the driver, by a simple manipulation of the cord or cords may, without difficulty or effort, raise or lower the implement to either of its extreme positions or by gradual stages adjust it to any intermediate position as desired for performing any particular class of work.

I claim:

1. In combination, a frame, a pinion thereon, a quadrant rack pivoted on the frame and meshing with said pinion, a supporting wheel rotatably mounted on said rack and eccentrically of the pivot thereof, means for rotating said pinion, and means controllable by the last means for locking said rack in any adjusted position.

2. In combination, a frame, a pinion thereon, a quadrant rack pivoted on the frame and meshing with said pinion, a supporting wheel rotatably mounted on said rack and eccentrically of the pivot thereof, means operable by the rotation of said wheel for rotating said pinion, and means for locking said rack in any position.

3. In combination, a frame, a pinion thereon, a quadrant rack pivoted on the frame and meshing with said pinion, a supporting wheel rotatably mounted on said rack and eccentrically of the pivot thereof, means operable by the rotation of said wheel for rotating said pinion, means for connecting or disconnecting the last means from said wheel according as said pinion is rotated or at rest, and means for locking said rack in any position.

4. The combination of an implement frame, a pinion thereon, a quadrant rack pivoted on the frame and meshing with said pinion, a stub axle mounted on said rack eccentrically to the pivot of said quadrant, a supporting wheel on said stub axle, detent means for locking the rack in any adjusted position, a drum operatively connected to said pinion, an operating cable wound upon said drum and connected at one end thereto the other end leading to a remote point for operation and means whereby the cable will release the lock when tensioned to rotate the drum to raise the frame.

5. The combination of an implement frame, a pinion thereon, a quadrant rack pivoted on the frame and meshing with said pinion, a stub axle mounted on said rack eccentrically to the pivot of said quadrant, a supporting wheel on said stub axle, detent means for locking the rack in any adjusted position, a drum operatively connected to said pinion, means whereby the cable will release the lock when tensioned to rotate the drum to raise the frame, and independent means for moving said detent means to release said quadrant.

6. The combination of an implement frame, a pinion thereon, a quadrant rack pivoted on the frame and meshing with said pinion, a stub axle mounted on said rack eccentrically to the pivot of said quadrant, a supporting wheel on said stub axle, detent means for locking the rack in any adjusted position, a drum operatively connected to said pinion, a second drum operatively connected to said wheel for assisting of the tensioning of said cord, said second drum receiving two or more turns of that portion of said cord between the first drum and the point of manipulation, and means whereby the cable will release the lock when tensioned to rotate the first drum and second drum to raise the frame.

7. The combination of an implement frame, a pinion thereon, a quadrant rack pivoted on the frame and meshing with said pinion, a stub axle mounted on said rack eccentrically to the pivot of said quadrant, a supporting wheel on said stub axle, detent means for locking the rack in any adjusted position, a drum operatively connected to said pinion, a second drum operatively connected to said wheel for assisting of the tensioning of said cord, said second drum receiving two or more turns of that portion of said cord between the drums and the point of manipulation, means whereby the cable will release the lock when tensioned to rotate the first drum and second drum to raise the frame, and means for operatively connecting the second drum with said wheel, said means being actuated by a tightening of the turns of said cord on the second drum, for the purpose described.

In witness whereof I have hereunto set my hand in the presence of two witnesses.

ERNEST MOSS.

Witnesses:
  CYRIL CARLYN COATES,
  SIDNEY JAMES TRELEAVEN.

Copies of this patent may be obtained for five cents each, by addressing the "Commissioner of Patents, Washington, D. C."